Feb. 28, 1956 A. A. WICKLAND 2,736,390
WET TYPE DUST COLLECTOR
Filed Feb. 4, 1953 2 Sheets-Sheet 1

INVENTOR.
Algot A. Wickland

Feb. 28, 1956     A. A. WICKLAND     2,736,390
WET TYPE DUST COLLECTOR
Filed Feb. 4, 1953     2 Sheets-Sheet 2
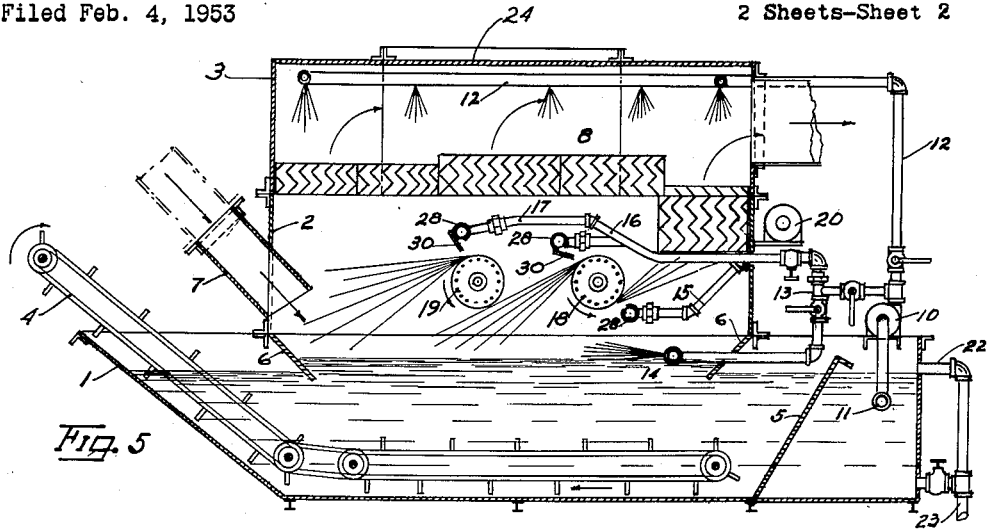
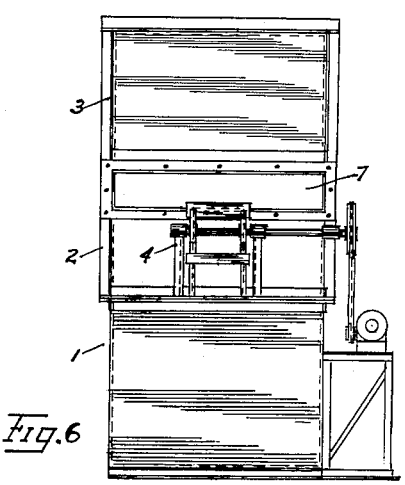
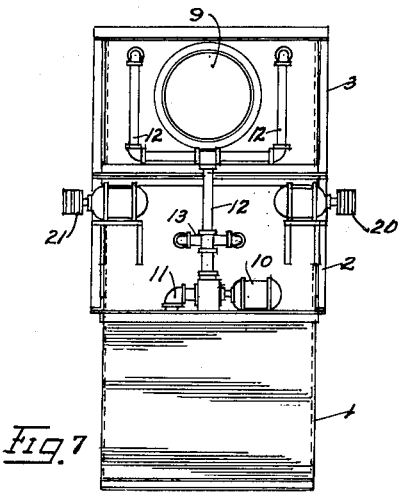
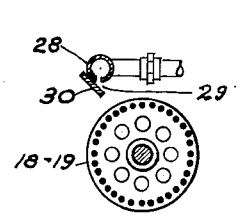
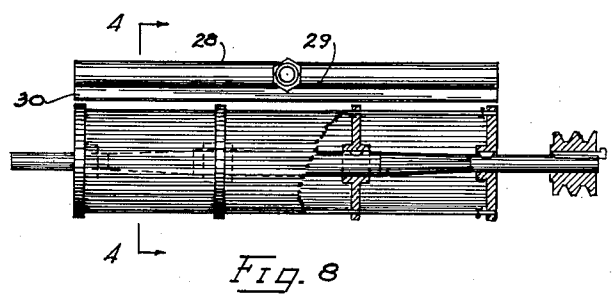
INVENTOR.
Algot A. Wickland

2,736,390

WET TYPE DUST COLLECTOR

Algot A. Wickland, Chicago, Ill.

Application February 4, 1953, Serial No. 335,081

3 Claims. (Cl. 183—22)

My invention relates to improvement in wet type dust collector particularly designed to arrest minute dust particles ordinarily encountered in industrial exhaust systems. It may also be used for suppression of cinders, fly ash, smoke and carbonous matter carried by effluvient gases emanating from iron melting furnaces known as cupolas.

One object of my invention is to provide mechanical means to atomize water into finely divided droplets projected at high velocity into a directional stream forming a counterflow barrier to the dust laden air or fumes passing through the collector by suction.

A further object sought is to provide dependable means to control the intensity, direction, volume and size of spray droplets comprising minute projectiles penetrating and colliding with dust particles carried in suspension by the incoming dust laden air or fumes.

Another object of my invention is to provide mechanical means to recirculate all water used in forming a spray curtain in conjunction with an atomizing element which cannot clog due to contamination of suspended foreign matter retained in the recirculated water.

A further object is that of having free access to all parts for convenient inspection, cleaning and replacement, as clearly shown in the accompanying drawings in which:

Figure 5 is a cross section at line 1—1, Figure 1.

Figure 6 is a front view.

Figure 7 is a rear view.

Figure 8 is a view of the centrifugal atomizing member spray pipe and deflector, with a section removed to view the driving shaft and discs.

Figure 9 is a section on line 4—4, Figure 8, showing atomizing member, spray pipe and deflector.

All numbers designate the same parts wherever they appear in the several views.

Figure 1:
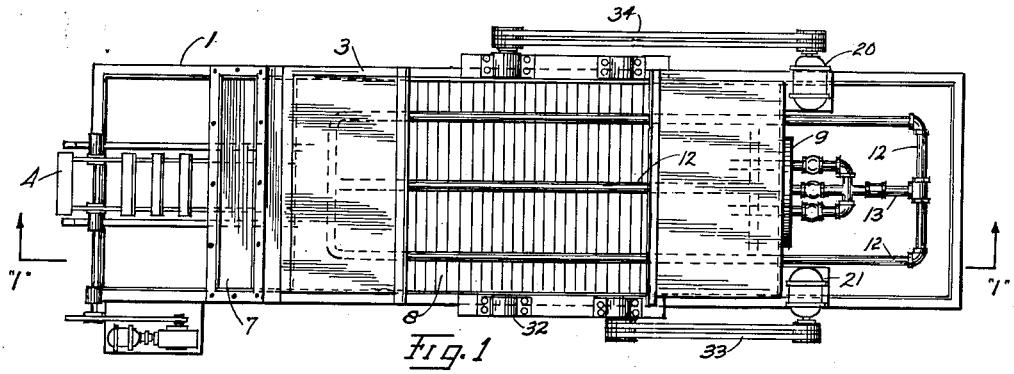
Figure 1 is a plan view showing clean air suction compartment with one panel removed to view dewatering plates, sludge conveyor and drive, motor drive for centrifugal atomizing drums, water circulating piping, etc.
Figure 2:
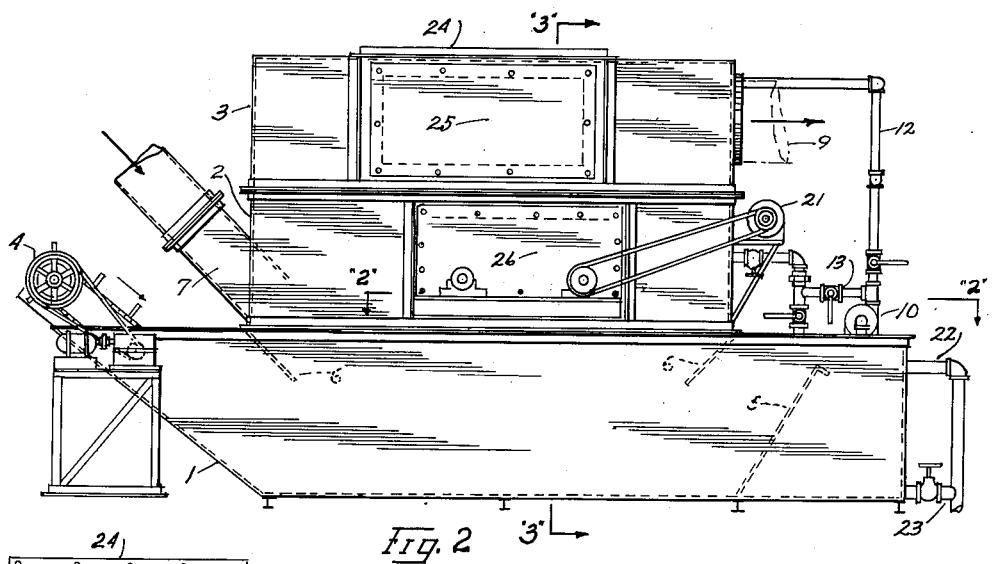
Figure 2 is a side view showing air inlet to dust separating compartment and outlet from the clean air compartment, also circulating pump and piping and overflow pipe and drain to sewer, sludge conveyor and drive.
Figure 4:
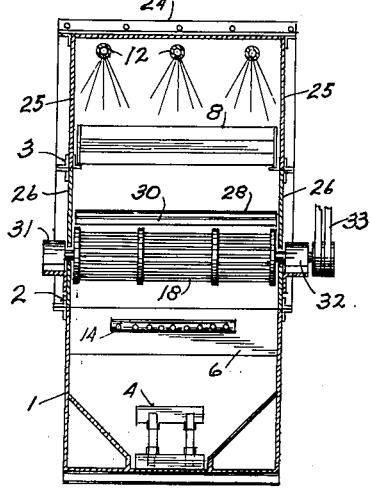
Figure 4 is a cross section on line 3—3, Figure 2, showing dewatering plates, overhead flushout pipes, atomizing drums, water spray pipe, also water return pipe and sludge conveyor.

Referring to the drawings, this apparatus consists of three main sections, namely, settling tank 1, dust collecting compartment 2 and clean air compartment 3, all bolted together to form a complete vacuum tight assembly when the settling tank is nearly filled with water. The settling tank is adapted to form a bottom channel guide for power driven sludge conveyor 4. Partition 5 separates the settling chamber from the clean water compartment, also has two diagonally mounted end plates 6—6 extending downward below the water line to form a vacuum tight seal.

This tank also supports circulating pump 10 and a fresh water supply with float 27, overflow 22 and drain 23; circulating pump 10 has an intake pipe with strainer 11 and the discharge has valved connections to flush pipe 12, branch connection 13, return water pipe branch 14, and water spray pipes 15, 16, 17.

Dust collecting compartment 3 has an intake 7 positioned diagonally to guide the air or gas stream to impinge upon the surface of the water in the settling tank, as shown. See Figure 5.

This compartment 2 has two power driven cages, drums or atomizing elements 18, 19, extending nearly from wall to wall, adapted to impart motion, disperse and atomize water into minute droplets at high velocity by means of a continuous stream of water discharging upon the periphery of the atomizing elements which revolve at high speed. Water required for atomizing is fed through pipes 15, 16, 17, respectively, each terminating into a manifold 28 having a plurality of orifices 29 directing a small and evenly distributed stream of water to pass over deflector 30. See Figures 8, 9. For certain applications deflector 30 can be omitted. Atomizing element assemblies 18, 19 are mounted on bearings 31, 32 and driven by belts 33, 34, connected to motor 20, 21 mounted on housing. See Figures 5, 7.

It should be noted that the periphery of the atomizing elements or rotors consists of horizontal bars, spaced some distance apart, as shown on Figures 8 and 9. This arrangement allows a portion of the water issuing from the jets to pass between the bars and enter the interior of the fast rotating atomizer. Water jets coming in contact with the fast moving bars encounter impact of such intensity that complete atomization takes place, converting the water into a mist or fine whirling spray attaining high potential velocity in nearly all directions.

Clean air compartment 3 is adapted to support sections of removable dewatering plates 8 which effectively arrests water globules carried by the air stream by impinging upon the plates. Removable air tight inspection panels 24, 25, 26 provide conveninet access to the interior for inspection and replacement. Pipe 12 is branched into three runs which are perforated and located near the roof inside the compartment for the purpose of washing down the walls and dewatering plates after a day's run. Outlet 9 is adapted to be piped to an exhaust fan having ample capacity and suction. When the collector is in operation the water level inside the dust collecting compartment will rise about four inches.

The incoming dust laden air stream encounters a counter flow of atomized water droplets moving at high speed, and it must pass through three directional spray barriers before entering the clean air compartment. Owing to the turbulence caused by the fast rotating atomizing members the volume of the entire dust collecting compartment is completely filled with minute water sprays propelled at high speed in all directions, thereby absorbing, penetrating and colliding with dust particles carried by the air stream.

Since water weighs about 830 times more than air, the droplets move at an initial speed of 85 feet per second, and owing to the initial kinetic energy developed, it is obvious that the penetrating effect and bombardment of an infinite number of water droplets will result in effective commingling and arresting of all dust particles carried by the dust laden air or fumes.

Figure 3:
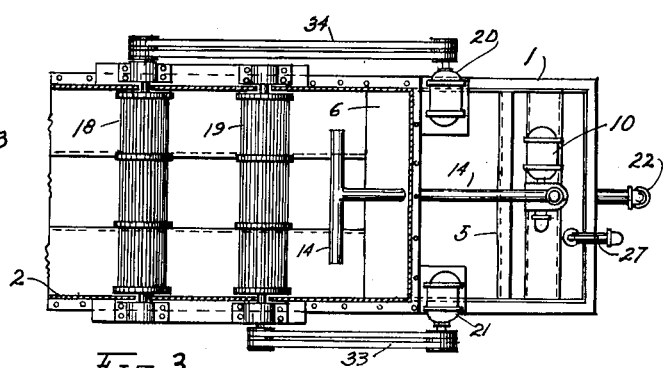
Figure 3 is a fragmentary plan view, section line 2—2, Figure 2, showing general arrangement of the atomizing drums and drives, the centrifugal water pump and water spray pipes are omitted for clearness.

As described, the incoming dust laden air enters the lower compartment diagonally downward causing the air stream to impinge upon the surface of the water within the compartment. In contact with water all dust particles are arrested and to prevent undue accumulation of trapped dust particles floating on the surface of water within the lower compartment, multiple water jets issue from branch pipe 14, see Figures 3 and 5. These jets are positioned so as to agitate the surface of the water also create a counter flow current to accelerate submersion of all particulate matter washed down by the combined action of hydraulic and mechanical water sprays, within the confines of the lower compartment.

The invention is not limited to the precise form nor to the details shown on the drawings and above described, but may be otherwise embodied without departing from the spirit or scope of the claims herein.

What I regard as new and desire to claim by Letters Patent is:

1. A washer of the class described comprising a vertical housing, a rectangular water reservoir integral therewith, said housing having two side walls, two end walls and a roof, the end walls of the housing being spaced from the end of the reservoir and extending into the reservoir beneath the water level therein, whereby an enclosure bounded by said end walls, side walls, roof, and water surface in the reservoir is formed, water eliminating baffles so positioned as to divide said enclosure into an upper and lower compartment, an air inlet duct for dust laden air extending diagonally downwardly into said lower compartment, an air outlet passage for clean air extending from said upper compartment, a plurality of motor driven rotors in said lower compartment, water inlet means comprising a plurality of longitudinal pipes having orifices therein, deflectors adjacent the periphery of said rotors and in impinging relationship with jets of water issuing from said orifices, whereby said jets are broken up and deflected into contact with the atomizing rotors, said pipes and deflectors extending parallel to the periphery of the rotors for substantially the axial length thereof.

2. A washer of the class described comprising a vertical housing, a rectangular water reservoir integral therewith, said housing having two side walls, two end walls and a roof, the end walls of the housing being spaced from the end of the reservoir beneath the water level therein, whereby an enclosure bounded by said end walls, side walls, roof, and water surface in the reservoir is formed, water eliminating baffles so positioned as to divide said enclosure into an upper and lower compartment, an air inlet duct for dust laden air extending diagonally downwardly into said lower compartment, an air outlet passage for clean air extending from said upper compartment, a plurality of motor driven rotors in said compartment, water inlet means comprising a plurality of longitudinal pipes having orifices therein, deflectors adjacent the periphery of said rotors and in impinging relationship with jets of water issuing from said orifices, whereby the said jets are broken up and deflected into contact with the atomizing rotors, said pipes and deflectors extending parallel to the periphery of the rotors for substantially the axial length thereof, said rotors or atomizers comprise a horizontally, rotatably mounted power driven shaft, having two or more circular discs keyed thereon, said discs being adapted to engage and hold a plurality of parallel equidistantly spaced bars at the periphery, said bars being either round, square, rectangular, triangular or hexagonal in cross section.

3. A washer of the class described comprising a vertical housing, a rectangular reservoir integral therewith, said housing having two side walls, two end walls and a roof, the end walls of the housing being spaced from the end of the reservoir and extending into the reservoir beneath the water level therein, whereby an enclosure bounded by said end walls, side walls, roof, and water surface in the reservoir is formed, water eliminating baffles so positioned as to divide said enclosure into an upper and lower compartment, an air inlet for dust laden air extending diagonally downwardly into said lower compartment, an air outlet passage for clean air extending from said upper compartment, a plurality of motor driven rotors in said lower compartment, water inlet means comprising a plurality of longitudinal pipes having orifices therein, deflectors adjacent the periphery of said motors and in impinging relationship with jets of water issuing from said orifices, whereby said jets are broken up and deflected into contact with the atomizing rotors, said pipes and deflectors extending parallel to the periphery of the rotors for substantially the axial length thereof, a horizontally positioned branch pipe having orifices directing jets of recirculated water having sufficient intensity to create formation of ripples, agitate, and cause a countercurrent of surface water confined within said lower compartment.

References Cited in the file of this patent

UNITED STATES PATENTS

| | | |
|---|---|---|
| 1,791,814 | Hillery | Feb. 10, 1931 |
| 1,798,822 | Wagner | Mar. 31, 1931 |
| 2,182,533 | Bowman | Dec. 5, 1939 |
| 2,212,752 | Schmieg | Aug. 27, 1940 |
| 2,237,482 | Faber | Apr. 8, 1941 |
| 2,496,281 | Fisher | Feb. 7, 1950 |
| 2,608,267 | Ortigies | Aug. 26, 1952 |

FOREIGN PATENTS

| | | |
|---|---|---|
| 645,984 | France | Nov. 6, 1928 |